B. SAMMEL.
DUST SUBDUER FOR MOTOR VEHICLES.
APPLICATION FILED FEB. 26, 1914.
1,097,674.
Patented May 26, 1914.
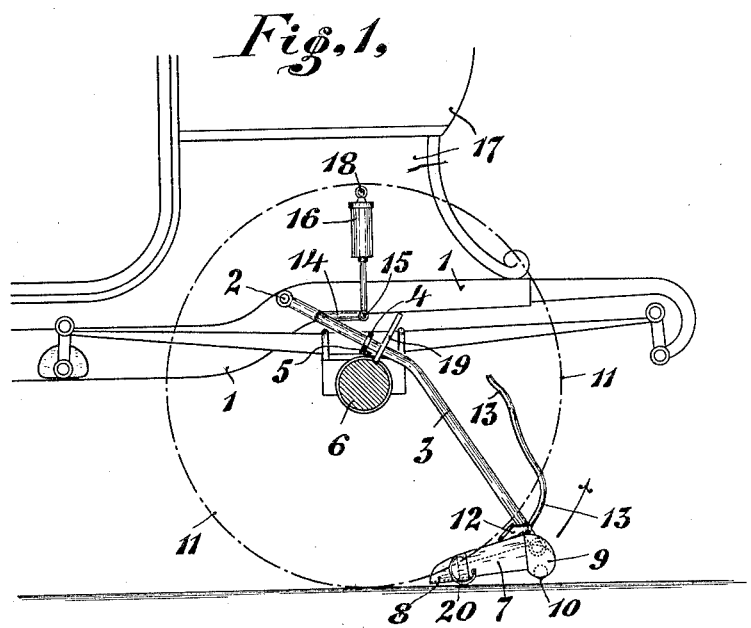
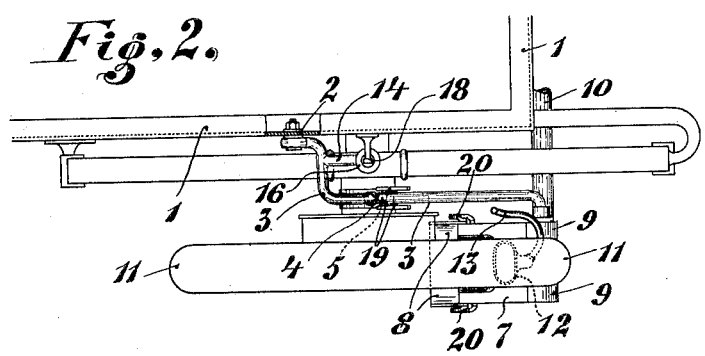
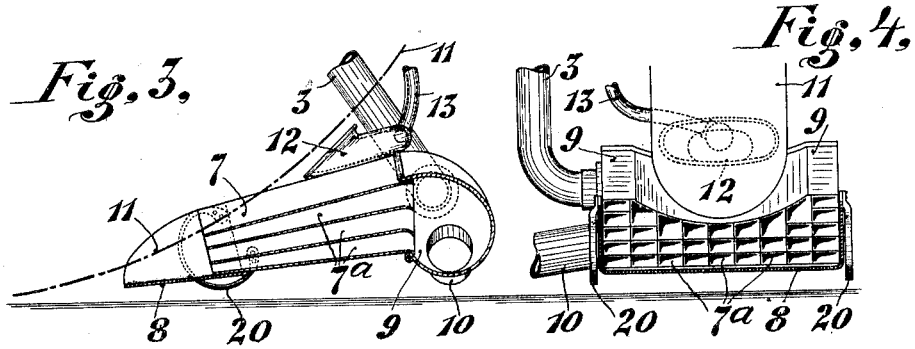
Witnesses:
Johann Engg
Carl Singry
Inventor:
Benno Sammel.

UNITED STATES PATENT OFFICE.

BENNO SAMMEL, OF BRUNSWICK, GERMANY.

DUST-SUBDUER FOR MOTOR-VEHICLES.

1,097,674.  Specification of Letters Patent.  Patented May 26, 1914.

Application filed February 26, 1914. Serial No. 821,275.

*To all whom it may concern:*

Be it known that I, BENNO SAMMEL, a subject of the Emperor of Germany, residing at Brunswick, Germany, have invented certain Improvements in Dust-Subduers for Motor-Vehicles, of which the following is a specification.

In order to subdue the dust raised by the wheels of motor vehicles, the latter are sometimes provided with dust collectors in the form of casings or funnels which are arranged behind the wheels and adapted to receive and check the dust and then discharge it through a lateral outlet.

The present invention relates to a device of this kind and consists essentially in the provision of means for guarding the dust collectors against violent impact with the ground and against consequent injury. This is effected by connecting the dust collector to an arm which is pivoted to the chassis and supported on the wheel axle so as to be turned by the latter for lifting the collector clear of any projection over which the wheel happens to pass. The arm is connected to a dash-pot which prevents a too sudden return of the collector to its normal position.

In the accompanying drawings the invention is illustrated, Figure 1 representing a side view of the device as applied to one of the rear wheels of a motor car, Fig. 2, a plan of the same, Fig. 3, a sectional side view of the dust collector, on an enlarged scale, and Fig. 4, a sectional front view of the same.

The dust collector consists of a casing 7 which is arranged behind the wheel so as to receive the dust raised by the latter. The casing is divided into a plurality of cells or passages 7ª which check the speed of the dust by its frictional contact therewith. The passages 7ª open into a collecting chamber 9 whence the dust is discharged through a lateral outlet 10. At the front of the casing 7 a scoop 8 is arranged which projects far into the gap between the ground and the wheel 11 so as to gather up the dust and lead it to the collector. The collector is carried by an arm 3 which is pivoted to the chassis 1 at 2 and which rests on the wheel axle 6. A wedge 5, which is held on the arm 3 by means of a clamp 4, is interposed between the axle and the arm so as to take the thrust and so as to enable, by being adjusted on the arm, the normal position of the collector relative to the ground to be regulated. From this arrangement it follows that the jumping movement of the wheel, ensuing upon the latter passing over a projection on the ground, will cause the arm 3 to turn about its pivot so as to lift the collector clear of such projection. To prevent the collector from dropping too rapidly into its normal position, the arm 3 is connected by means of a bracket 14 to a dash-pot 16, the latter being pivoted at 15 to the bracket 14 and at 18 to the carriage body 17. Resilient runners 20 are connected to the sides of the casing 7 so as to take the thrust and deaden the shock of slight contacts which the collector, in spite of the precautions, may have to sustain. A pair of brackets 19, connected to the axle 6 at opposite sides of the arm 3, serves as guides for the latter.

An elastic funnel 12, connected by means of a flexible pipe 13 to some chamber in which vacuum is maintained, is mounted on the casing 7 so as to be near the wheel 11. Owing to this arrangement, the fine and light dust which generally follows the wheel instead of passing to the collector, will be drawn into the funnel 12 by suction and absorbed.

I claim:—

1. In a dust subduer for motor vehicles, the combination with a dust collector, of an arm to which said collector is connected, said arm being pivoted to the chassis and supported by the wheel axle so as to hold the dust collector normally near the ground behind the wheel and so as to lift the collector, owing to the jumping movement of the wheel, clear of any projection over which the wheel may pass, substantially as and for the purpose set forth.

2. In a dust subduer for motor vehicles, the combination with a dust collector, of an arm to which said collector is connected, said arm being pivoted to the chassis and supported by the wheel axle so as to hold the dust collector normally near the ground behind the wheel and so as to lift the collector, owing to the jumping movement of the wheel, clear of any projection over which the wheel may pass, and a wedge interposed between the axle and the arm and connected to the latter so that it can be adjusted thereon for regulating the normal position of the dust collector relative to the ground, substantially as set forth.

3. In a dust subduer for motor vehicles, the combination with a dust collector, of an arm to which said collector is connected, said arm being pivoted to the chassis and supported by the wheel axle so as to hold the dust collector normally near the ground behind the wheel and so as to lift the collector, owing to the jumping movement of the wheel, clear of any projection over which the wheel may pass, and a dash-pot pivoted to said arm and to the body of the vehicle so as to prevent the collector from returning too rapidly to its normal position, substantially as set forth.

4. In a dust subduer for motor vehicles, the combination with a dust collector arranged behind the wheel so as to receive and check the dust, an elastic suction funnel mounted on said collector so as to absorb the fine dust following the wheel, and an arm holding the collector and pivoted to the chassis, said arm being supported on the wheel axle so as to be turned by the latter for lifting the collector clear of any projection over which the wheel may pass, substantially as and for the purpose set forth.

5. In a dust subduer for motor vehicles, the combination with a dust collector in the form of a casing arranged behind the wheel so as to receive and check the dust, a scoop arranged in front of the casing so as to lead the dust into the latter, and an arm holding the collector and pivoted to the chassis, said arm being supported on the wheel axle so as to be turned by the latter for lifting the collector clear of any projection over which the wheel may pass, substantially as and for the purpose set forth.

BENNO SAMMEL.

Witnesses:
ANNA WINTER,
MARIE BŎEK.

Copies of this patent may be obtained for five cents each, by addressing the "Commissioner of Patents, Washington, D. C."